(12) United States Patent
Saltel (10) Patent No.: US 8,091,640 B2
(45) Date of Patent: Jan. 10, 2012

(54) METHOD AND DEVICE FOR CEMENTING A WELL OR A PIPE

(75) Inventor: Jean-Louis Saltel, Le Rheu (FR)

(73) Assignee: Saltel Industries (FR)

(*) Notice: Subject to any disclaimer, the term of this patent is extended or adjusted under 35 U.S.C. 154(b) by 419 days.

(21) Appl. No.: 12/085,846

(22) PCT Filed: Nov. 22, 2006

(86) PCT No.: PCT/EP2006/068775
§ 371 (c)(1),
(2), (4) Date: May 29, 2008

(87) PCT Pub. No.: WO2007/063016
PCT Pub. Date: Jun. 7, 2007

(65) Prior Publication Data
US 2009/0151929 A1   Jun. 18, 2009

(30) Foreign Application Priority Data
Nov. 30, 2005   (FR) .................................. 05 12117

(51) Int. Cl.
*E21B 33/00* (2006.01)
(52) U.S. Cl. .................. 166/285; 166/287; 166/191
(58) Field of Classification Search .................. 166/285, 166/287, 289, 290, 191, 186, 277
See application file for complete search history.

(56) References Cited

U.S. PATENT DOCUMENTS

| | | | |
|---|---|---|---|
| 3,762,446 A | 10/1973 | Tungseth et al. | |
| 3,834,421 A | 9/1974 | Daley | |
| 4,467,835 A * | 8/1984 | Champleboux | 138/93 |
| 4,582,551 A | 4/1986 | Parkes et al. | |
| 5,027,895 A | 7/1991 | Barton | |
| 5,101,908 A * | 4/1992 | Mody | 166/387 |
| 5,316,081 A * | 5/1994 | Baski et al. | 166/188 |
| 5,695,008 A | 12/1997 | Bertet et al. | |
| 7,584,787 B2 | 9/2009 | Saltel | |
| 2004/0055758 A1 | 3/2004 | Brezinski et al. | |

* cited by examiner

*Primary Examiner* — David Bagnell
*Assistant Examiner* — Sean Andrish
(74) *Attorney, Agent, or Firm* — Lerner, David, Littenberg, Krumholz & Mentlik, LLP (57) ABSTRACT

Introducing within a well or pipe a mandrel equipped with an inflatable membrane which can expand radially under the effect of an internal pressure. Positioning the mandrel opposite the portion to be treated, in introducing a pressurized fluid within the membrane such that its end regions form annular bulges pressing firmly against the wall, whereas its mid-region expands to a lesser degree. Forming a peripheral annular space into which is then injected a cement which is liquid but able to harden. Leaving the cement to set so as to form a solid sleeve. Deflating the tubular membrane. Withdrawing the mandrel together with the deflated membrane. The method can be used in the oil sector, particularly for repairing and/or plugging a portion of casing.

11 Claims, 7 Drawing Sheets

METHOD AND DEVICE FOR CEMENTING A WELL OR A PIPE

BACKGROUND OF INVENTION

The present invention relates to a method and a device for cementing a well or a pipe, for example a casing, having a portion to be treated so as to make it leaktight, in particular to be repaired and/or plugged.

It applies more particularly, but not necessarily, to the field of oil production.

The casing is a metal tube which lines the interior of the oil well over a considerable length.

As an indication, this length is for example between 2000 and 4500 meters, whereas its internal diameter is between 120 and 200 millimeters.

In the lower part, the casing is perforated at the level of the deposit(s) that it passes through, so as to allow the passage of oil or a gaseous hydrocarbon.

Located in the upper part of the well is the wellhead, which is equipped with various systems, in particular for protection, suspension and sealing purposes.

Over a considerable length of the upper part of the well, for example between 1500 and 4000 meters, the casing is provided internally with completion equipment comprising a tube and various devices serving for exploitation of the well, such as temporary plugs and safety valves for example.

Over time, a portion of the wall of the casing may have to be sealed, in particular if has deteriorated, for example due to premature wear and/or cracking, or when the perforations intended for the passage of oil have to be plugged, in particular because the deposit has been depleted in this zone and undesirable fluid products (in particular water or gas) risk passing through the wall of the casing and penetrating into the latter.

For this purpose, said portion is treated by coating it internally with a protective material, in particular a cement, a gel or a composite material based on polymerisable resin.

In order to carry out this treatment, two different techniques may be used:
  either the completion equipment is removed beforehand and it is then possible to gain direct access to the portion of the casing to be treated,
  or the tools and the material used for cementing purposes are passed through the completion equipment.

The first technique is time-consuming and expensive and may cause exploitation problems, in particular due to the fact that it is necessary to completely neutralise the well prior to any intervention.

The second technique is complicated, expensive and can be used only in a certain limited number of configurations, due to the fact that the completion equipment generally has a much smaller diameter than that of the lower zone of the casing in which the portion to be treated is located.

In particular, the installation of a cement coating is generally not possible using this technique.

The invention aims to overcome these difficulties by proposing a method and a device which make it possible to cement the lower zone of the casing while passing through the completion equipment of smaller diameter.

The invention can be applied not only to a casing as described above, but also to any hollow well in the ground or to any pipe, buried or otherwise, and for this reason the description and the claims which will follow refer to the cementing of a well or a pipe, the latter being able to be a casing or any other conduit, vertical, horizontal or oblique.

SUMMARY OF THE INVENTION

The subject matter of the invention is therefore a method for cementing a well or a pipe, for example a casing, having a portion to be treated, in particular to be repaired and/or plugged.

According to this method:
  a) a tubular mandrel is introduced into the well or pipe, around which mandrel there is mounted an inflatable membrane which is also tubular and is made of a flexible and elastic material which can expand radially under the effect of an internal pressure, and this assembly is positioned opposite the portion to be cemented;
  b) a pressurised fluid is introduced into the membrane and the latter is inflated in such a way that, on the one hand, its end zones dilate radially and considerably, forming annular beads which are applied firmly against the wall of the well or pipe, on either side of the portion to be cemented, and that, on the other hand, its zone—referred to as the median zone—located between its end zones also dilates radially, but with a lesser amplitude, so that an annular space is formed between this median zone and the portion of wall to be cemented;
  c) while the membrane is kept inflated, a liquid but curable cement is injected into this annular space;
  d) the cement is left to set so that it forms a solid sleeve which internally coats said wall portion of the well or pipe;
  e) the tubular membrane is deflated;
  f) the assembly consisting of the mandrel and the deflated membrane is withdrawn from the well or pipe.

The device for cementing a well or a pipe, for example a casing, having a portion to be treated, in particular to be repaired and/or plugged, which device also forms the subject matter of the invention, is characterised in that it comprises an assembly which is designed to be introduced into the well or pipe and to be positioned opposite the portion to be cemented, this assembly consisting of a tubular mandrel and an inflatable membrane which is also tubular and surrounds said mandrel, the wall of the membrane being made of a flexible and elastic material which can expand radially under the effect of an internal pressure, means being provided for introducing a pressurised fluid into said membrane in order to inflate it, and in that the end zones of said membrane are able to dilate radially and considerably in such a way as to form annular beads which can be applied firmly against the wall of the well or pipe, on either side of the portion to be cemented, and that, on the other hand, its zone—referred to as the median zone—located between its end zones also dilates radially, but with a lesser amplitude, so that an annular space is formed between this median zone and the portion of wall to be cemented, this device additionally comprising means for injecting a liquid but curable cement into this annular space while the membrane is kept inflated, and means for deflating said membrane once the cement has set.

Furthermore, according to a certain number of advantageous, but non-limiting, features of this device:
  said tubular membrane is secured to said mandrel by an annular part—referred to as the anchoring part—which is radially non-extendable and is located within said median zone, whereas its end zones are fixed to movable rings which are guided in translation in a sealed manner on the mandrel and can slide axially on the latter as a result of the inflation or deflation of said membrane;

the median zone of said membrane is provided with means capable of limiting its radial expansion to a predetermined maximum diameter;

said membrane is reinforced by an armature comprising at least one ply of cables, wires or fibres wound helically with respect to its longitudinal central axis;

in said median zone, the initial angle formed tangentially by said cables, wires or fibres with respect to the longitudinal central axis of the membrane is such that, after inflation, the diameter of the membrane reaches a predetermined given value when this angle reaches a value of around 54°;

the transition between the anchoring part of the membrane and the portions of its median zone with limited radial expansion takes place by means of portions, referred to as "portions adjacent to the anchoring part", which are able to deform under the effect of the inflation so as to be placed in planes which are substantially perpendicular to the longitudinal central axis of the membrane;

the initial angles of inclination (before inflation of the membrane) of the cables, wires or fibres with respect to the longitudinal central axis of the membrane have approximately the following values:

of around 18° to 25° in the end zones of the membrane;
of around 35° to 45° in its median zone, except in the portions adjacent to the anchoring part;
of 0° in the portions adjacent to the anchoring part;

said membrane is reinforced by an armature comprising several plies of wires or fibres wound helically with respect to its longitudinal central axis, the directions of winding of the two superposed plies being reversed;

the portions adjacent to the anchoring part are grooved, each of these portions having at least one groove located in the axial extension of a similar groove formed in the other portion, so that, after inflation of the membrane, they form a channel for injection of the cement, this injection taking place through at least supply orifices penetrating the tubular mandrel and the anchoring part, via a suitable valve;

the wall of the mandrel is penetrated by inlet orifices for an inflation fluid, which orifices open into the interior of the membrane between said movable rings and said anchoring part;

the wall of the membrane is grooved externally at its end zones, so as to allow the evacuation of the fluid present in the well or pipe during inflation;

said membrane is covered with a thin-walled sleeve which is made of a flexible and elastic material and which can be pressed against the portion of wall to be cemented when the cement is injected into the annular space formed between the median zone of the membrane and the portion of wall to be cemented;

said sleeve is able to inflate, increasing in volume in the direction of its thickness, when it is in contact with the liquid present in the well or pipe, so as to ensure good sealing with the zone of the well to be sealed;

the device comprises means so that one of the two annular end beads is applied against the wall of the well or pipe before the other end bead.

BRIEF DESCRIPTION OF THE DRAWINGS

Other features and advantages of the invention will become apparent from the description which will now be given thereof, with reference to the appended drawings, in which:

FIGS. 9 to 14 illustrate various steps of the method. In these figures, the longitudinal axis of the well or pipe (and therefore of the device) has been shown horizontally in order to facilitate the page layout of the drawings; this axis could of course be vertical, as in FIGS. 1 and 2.

DETAILED DESCRIPTION

Figure 1:
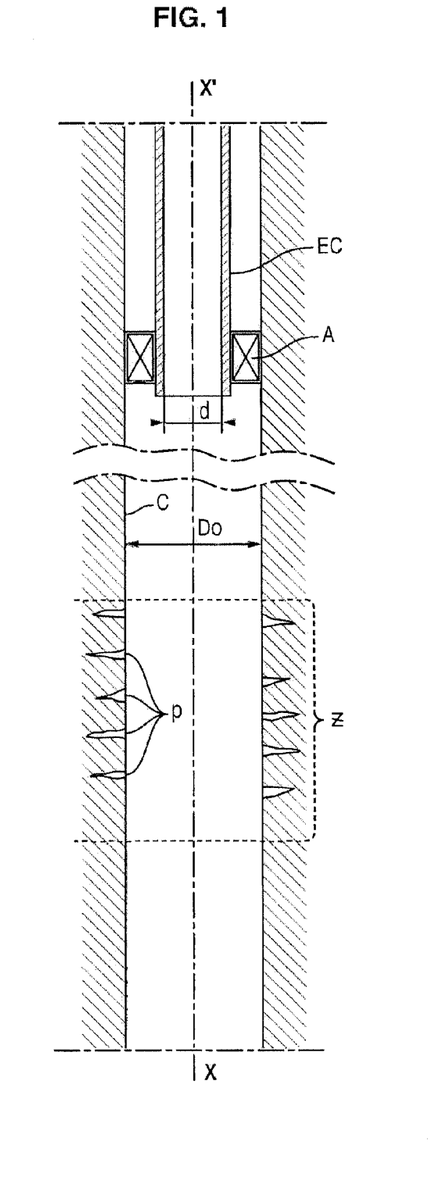
FIGS. 1 and 2 show, in a highly schematic manner and in axial section, part of an oil well respectively before and after cementing of a damaged portion.

FIG. 1 shows part of an oil drilling well, lined with a casing C with a cylindrical wall and of vertical axis X-X'. A portion Z of this casing has for example perforations p, producing water, which it is desired to plug by means of cementing.

Reference EC denotes completion equipment, held in place by an annular centring element A, and the internal diameter d of which is much smaller than the diameter $D_0$ of the casing.

By way of example, the diameter d is around 69 mm whereas the diameter $D_0$ is around 155 mm.

Figure 2:
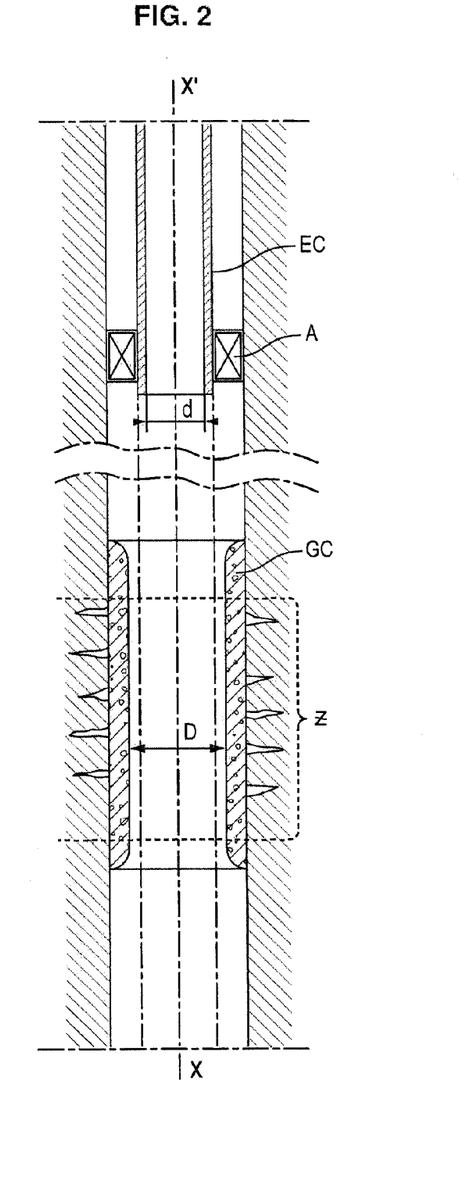

FIG. 2 shows the same well part after installing a cement coating GC in the portion Z.

In order not to disrupt exploitation of the well, it is important that the internal diameter D of this coating is greater than d.

It will be understood that this installation usually poses difficulties when it takes place through the completion equipment EC.

As will now be explained, the invention nevertheless makes it possible to carry out this procedure easily.

The device of the invention which is shown in FIGS. 3 to 7 essentially comprises a cylindrical tubular mandrel 1, of axis X-X', for example made of steel, which is covered with a similarly cylindrical membrane 2, in the form of a sleeve, made of a flexible and elastic material which is resistant to pressure and corrosion, for example rubber or elastomer.

At rest (FIGS. 3 and 4), the membrane surrounds the mandrel without play, or even with a slight clamping action.

Figure 3:
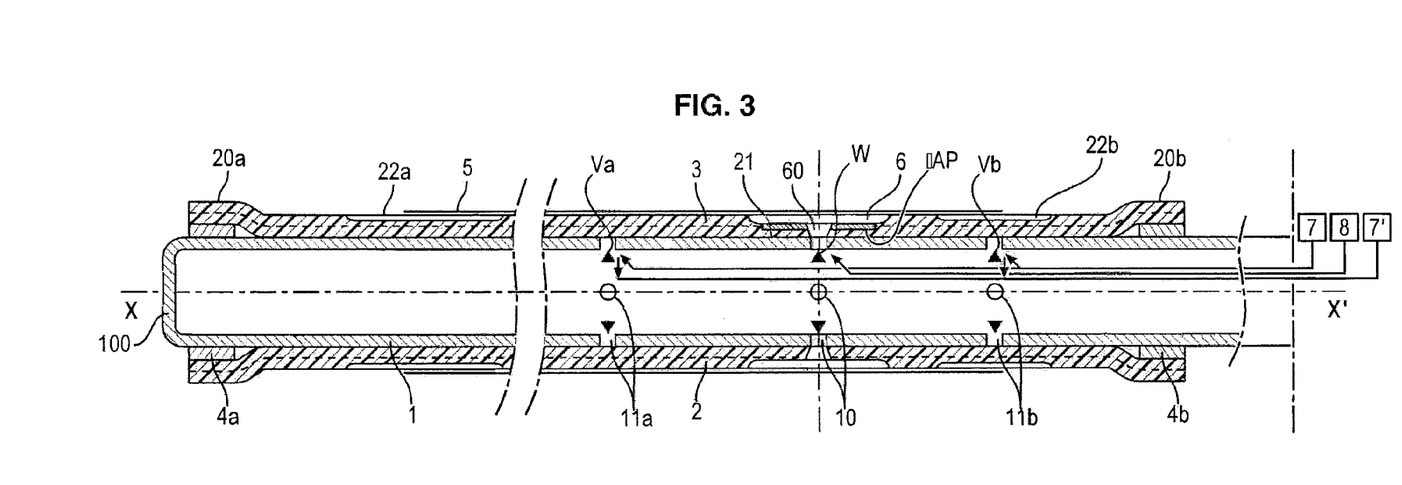
FIGS. 3 and 4 are schematic views of a device according to the invention, in the non-inflated state, respectively in axial section and in front view.
Figure 4:
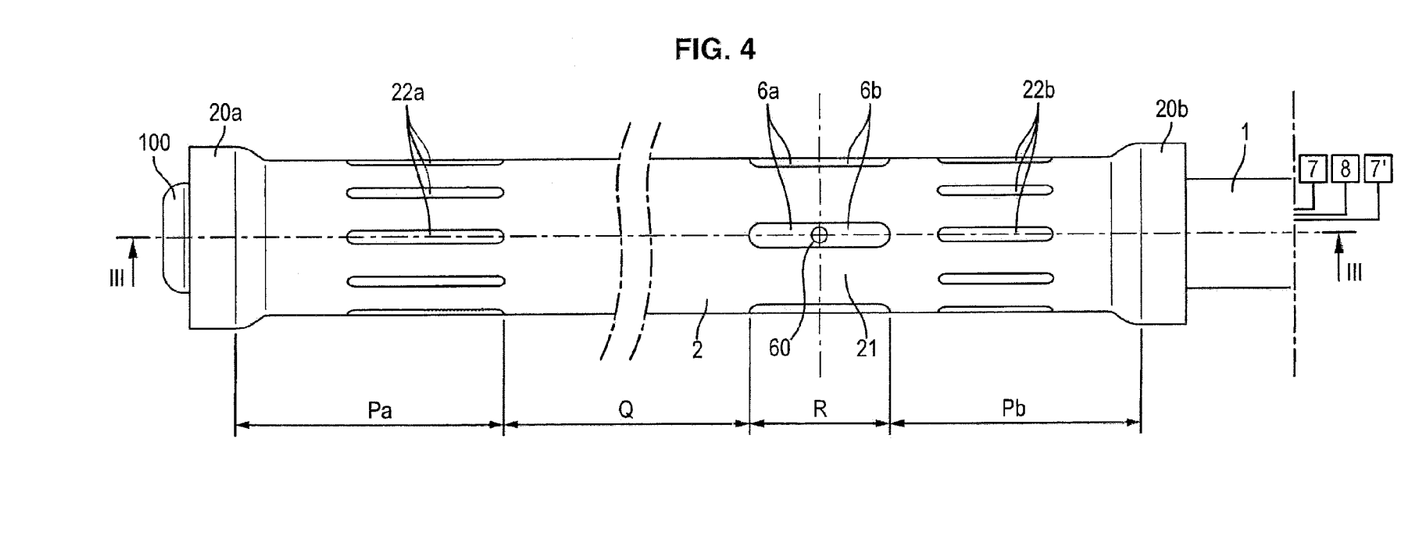

The mandrel has a closed free end 100.

Only the end portion of the mandrel carrying the membrane is shown. This mandrel is mounted at the end of a rod of considerable length (located towards the right in FIGS. 3 and 4), which passes into the tube of the completion equipment EC, and meets the wellhead.

The overall diameter of the assembly consisting of the mandrel and the membrane is slightly smaller than the internal diameter d of the completion equipment EC, so that it can pass through the latter in the axial direction.

Its length is selected as a function of that of the zone Z to be treated; it is a few meters for example.

In its end zones 20a, 20b, the membrane 2 is fixed, for example by glueing, to rings 4a and respectively 4b which are guided in axial translation on the mandrel 1.

Between the end zones 20a, 20b, and markedly closer to the zone 20b than to the zone 20a in the embodiment shown, a zone 21 of the membrane is directly fixed around the mandrel by a thin annular part of small length, referred to as the anchoring part. This fixing is carried out for example by means of a small clamping ring which is embedded in the membrane (and is not shown), supplemented by glueing.

The zone 21 is grooved longitudinally; in the example shown, four identical grooves 6 are provided which are spaced apart by 90° with respect to the axis X-X' and have a semi-circular cross section.

Their centre is located at the aforementioned anchoring part, from which "half-grooves", referenced 6a and 6b, therefore depart.

At the anchoring part, the mandrel is pierced by four radial orifices 10 which each open, via corresponding perforations 60 provided in the wall of the membrane, into the centre of a groove 6.

Over a certain length, denoted Pa, Pb in FIG. 4, of each connection zone 20a and respectively 20b of the membrane with the rings 4a and 4b, the tubular membrane is able, as will be seen below, to dilate radially with a relatively great amplitude, under the effect of an internal pressure.

On one side (on the right of the figure), this part—which will be referred to overall as the "end zone"—connects the zone 20b to the zone 21, the length of which is referenced R.

On the other side, an intermediate part—referred to as the "median zone"—is placed between the zone 20a and the zone 21.

This median zone has a length Q which is substantially equal to, or slightly greater than, that of the portion to be cemented.

The end zones are provided with peripheral grooves 22a, 22b.

On each side of the anchoring part of the membrane, the mandrel 1 is pierced by a certain number of orifices 11a and 11b which are similar to the aforementioned orifices 10.

The opening and closing of the orifices 10 and 11a, 11b is controlled by suitable valves W and respectively Va, Vb.

The membrane 2 is partially covered by a sleeve 5 made of a flexible and thin material, for example rubber, which connects the end zones and terminates more or less in the middle of the grooves 22a and 22b (see FIG. 3). This sleeve is assumed to have been removed in FIGS. 4 to 6 so as not to be detrimental to the legibility thereof.

The wall of the membrane 2 is reinforced by an inner armature 3, embedded within its wall.

As known per se (see for example the document U.S. Pat. No. 5,695,008), this armature consists of several concentric plies (or layers) consisting of flexible wires or fibres with high mechanical strength, wound in a helical manner.

The directions of winding of two superposed plies are reversed so that the membrane deforms in a homogeneous manner, in particular without any twisting.

During the radial expansion of the membrane, the angle of inclination of the tangent to each fibre with respect to the longitudinal axis X-X' gradually increases and may—as is also well known—reach an equilibrium value of 54°, beyond which expansion is no longer possible.

Figure 6A:
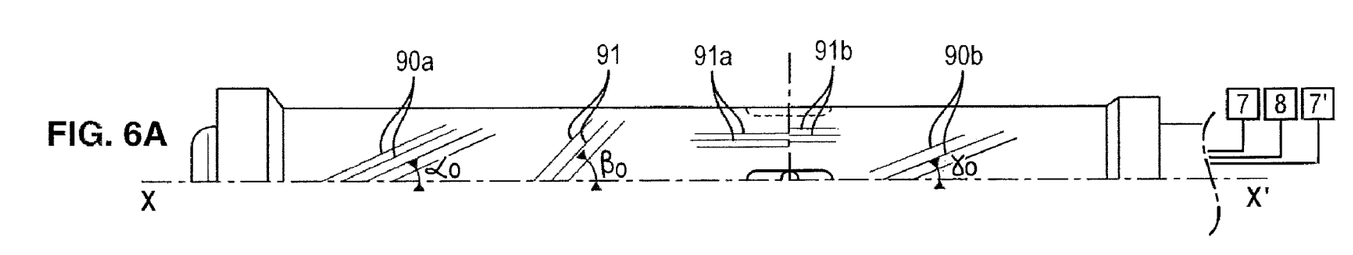
FIGS. 6A and 6B are diagrams of the same device which are intended to show the orientations of the wires or fibres of the armature of the membrane, before (FIG. 6A) and after (FIG. 6B) the inflation.
Figure 6B:
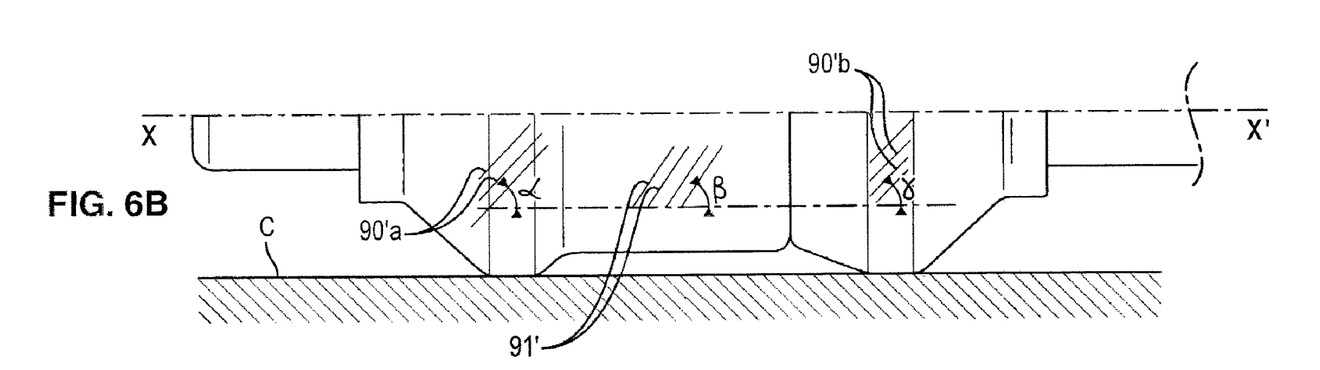
Figure 7:
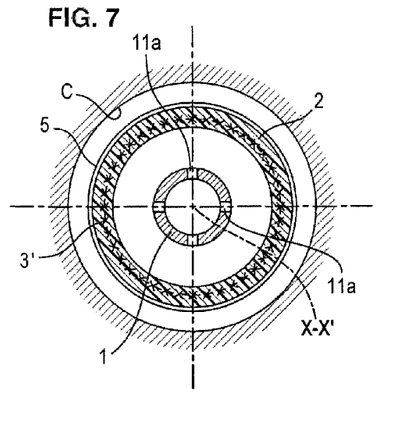
FIG. 7 is a cross section of the device in the plane VII-VII of FIGS. 5A and 5B.

According to one feature of the invention, the angle of winding of the fibres or wires is not the same over the entire length of the membrane, as illustrated in FIG. 6.

In the end zones of length Pa and Pb, the wires or fibres are referenced 90a, respectively 90b before inflation and 90'a, respectively 90'b after inflation. They form, with respect to the axis X-X', an initial angle, referenced respectively $\alpha_0$ and $\gamma_0$, with a relatively low value. This value is determined taking account of the initial diameter of the membrane and the internal diameter of the wall of the casing, against which these zones have to bear after inflation.

It is therefore necessary for the angle α and respectively γ after inflation to be less than the limit angle of 54°.

In the intermediate median zone of length Q, in which the wires or fibres are referenced 91 before inflation and 91' after inflation, the angle $\beta_0$ must have a value larger than the angles $\alpha_0$ and $\gamma_0$.

Its value is determined taking account of the initial diameter of the membrane and the internal diameter which the sheath of the cement coating must have after the operation.

This is because the radial expansion of this median zone must be limited upon inflation, and the angle of 54° must be reached before this zone bears against the wall of the casing, after a given amplitude of expansion, which will calibrate the peripheral space which is intended to receive the cement.

In practice, the value of the angles $\alpha_0$ and $\gamma_0$ is for example around 18 to 25° and that of the angle $\beta_0$ is around 35 to 45°.

After inflation, the angles α and γ have a value of around 45° and the angle β is close to 54°.

In the grooved zone 21 of length R which extends on either side of the anchoring part, the fibres or wires of the armature, referenced 91a and 91b, are directed in the axial direction, thus forming a zero angle with respect to the axis X-X'. By virtue of this arrangement, the deformation upon inflation of this portion adjacent to the anchoring part is not hindered by the presence of the fibre or wire armature, even though the zones of the membrane located on either side of the anchoring part are placed in planes perpendicular to the axis X-X' as a result of the inflation, moving closer to one another, as can be seen in FIGS. 5A, 5B, 6A, and 6B.

Figure 5A:
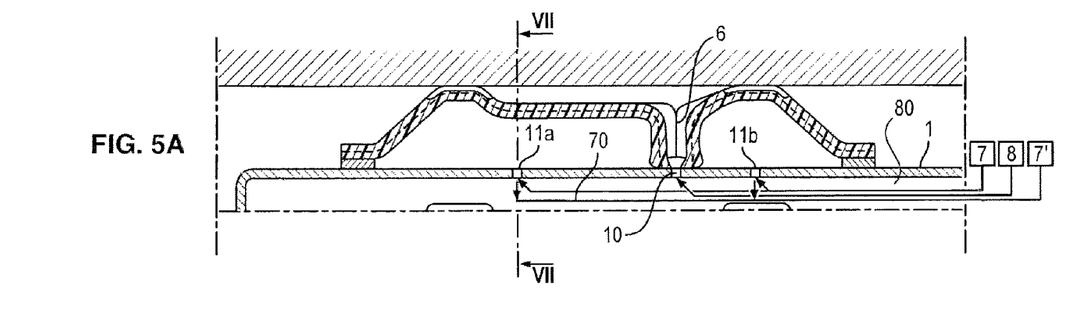
FIGS. 5A and 5B show the same device after inflation, FIG. 5A being an axial half-section and FIG. 5B being a front half-view.
Figure 5B:
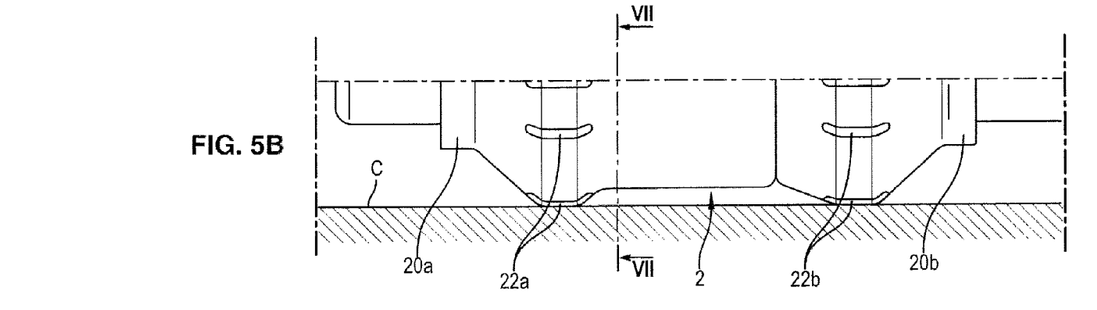

The half-grooves 6a and 6b are thus arranged opposite one another, forming a radial channel 6.

The orifices 10 are connected by means of a suitable conduit 80 to a source 8 for distributing a liquid but curable material L2, such as a cement loaded with short fibres, it being possible for this distribution to take place via a pump located in the wellhead or directly in the well from a suitable reservoir.

Similarly, the orifices 11a and 11b are connected by means of a suitable conduit 70 to a source 7 for distributing, at high pressure, a fluid L1, for example water, it also being possible for this distribution to take place via a pump located in the wellhead or directly in the well by using the fluid present therein. The orifices 11a and 11b are also connected to a source for aspirating 7' the fluid L1, thus making it possible to deflate the membrane at the end of the operation.

Referring to FIGS. 9 to 14, it will now be explained how the device that has just been described is used to cement a casing, according to the method of the invention.

Figure 9:
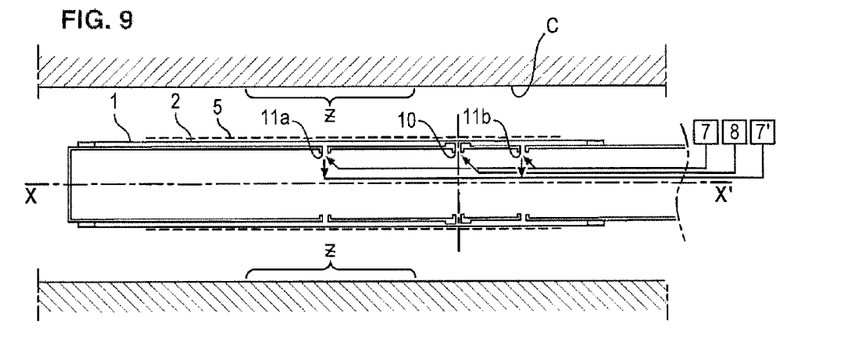

With reference to FIG. 9, the device is moved in the deflated state until it is opposite the portion Z of the casing C that is to be treated.

Figure 10:
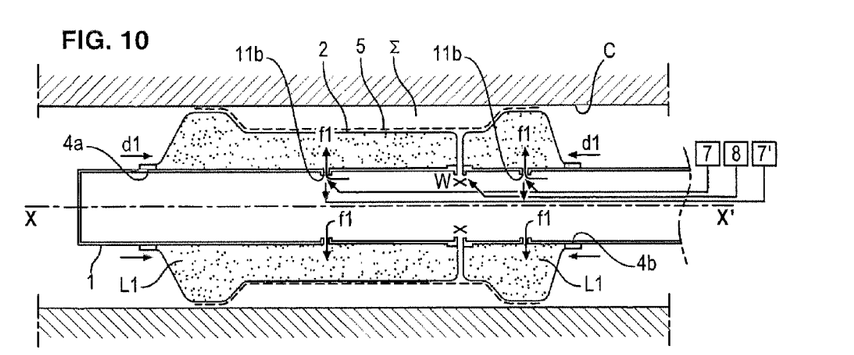

The membrane 2 is then inflated, after having brought about the opening of the valves Va and Vb (the valve W being closed), by introducing the pressurised fluid L1 between said membrane and the outer wall of the mandrel 1 via the orifices 11a and 11b, as symbolised by the arrows f1 in FIG. 10. During the inflation, the end rings slide axially and move towards one another (arrows d1) since the radial expansion of the membrane causes it to shorten in the axial direction.

Suitable retaining means, not shown, are advantageously provided so that one of the zones forming a bead, for example Pb, inflates fully before the other zone (for example Pa) so as to prevent any jamming of the device in the longitudinal direction during the inflation.

These means are for example frangible wires which are wound around these zones and can be broken at a given pressure, those surrounding the zone Pb being designed to break before those surrounding the zone Pa.

Another solution, for example, is to offset slightly over time the supply to the interior spaces in these zones, thus offsetting the opening of the valve Va with respect to that of the valve Vb.

The end zones form beads which are pressed firmly against the wall of the casing. On the other hand, since the median zone has a limited expansion due to the greater inclination of the wires or fibres of the armature, a peripheral annular space Σ remains at this location.

Figure 8A:
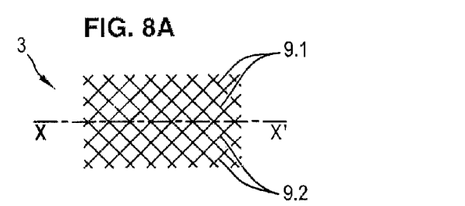
FIGS. 8A and 8B are diagrams which show the change in orientation of the wires or fibres of two adjacent plies as a result of the inflation.

With reference to the diagram in FIG. 8A, it is possible to see, before inflation, two "crossed" series of fibres or wires 9.1 and respectively 9.2 belonging to two adjacent (superposed) plies of the armature 3 with which the median zone is provided.

Figure 8B:
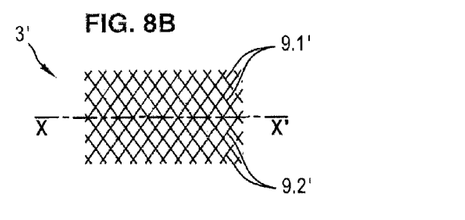

At the end of inflation, shown in FIG. 8B, this armature—denoted 3'—has been deformed, the fibres or wires 9.1' and 9.2' of each of the two plies having a modified inclination, so as to form an angle of around 54° with respect to X-X'.

The two portions adjacent to the anchoring part, for their part, are placed in transverse planes and are pressed against one another.

Of course, the connections between the different zones take place in a gradual manner, due to the flexibility and elasticity of the membrane and also a gradual change in the angles of the fibres, and not via sharp angles.

Once the membrane has inflated, the valves Va and Vb are closed in order to keep the membrane in this state.

It then forms a type of counter-mould, or coffer, for moulding the cement.

Figure 11:
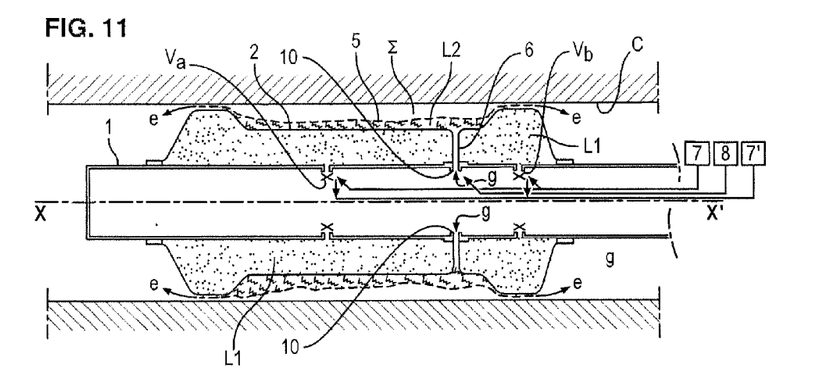

The valves W are then opened and the liquid cement L2 is introduced, via the orifices 10 and the channels 6 in the peripheral space Z, into the sleeve 5. The latter is then inflated in turn, chasing away the liquid present in the well, for example sludge, which is located in the space Z. This liquid can escape via the grooves 22a, 22b provided for this purpose in the end zones of the wall, which form beads.

This escape is symbolised by the arrows e in FIG. 11.

Figure 12:
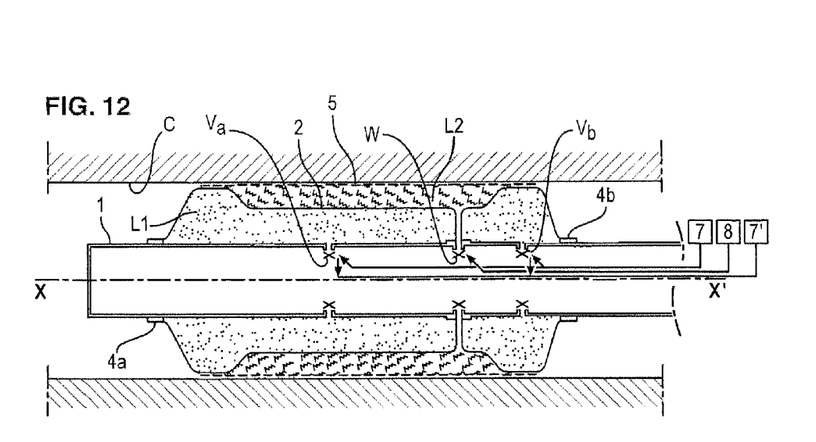

Thus, as shown in FIG. 12, the liquid cement L2 finally fills the entire space Z, with the sleeve 5 being pressed against the casing.

The valves W are then closed and the cement is left to set.

Figure 13:
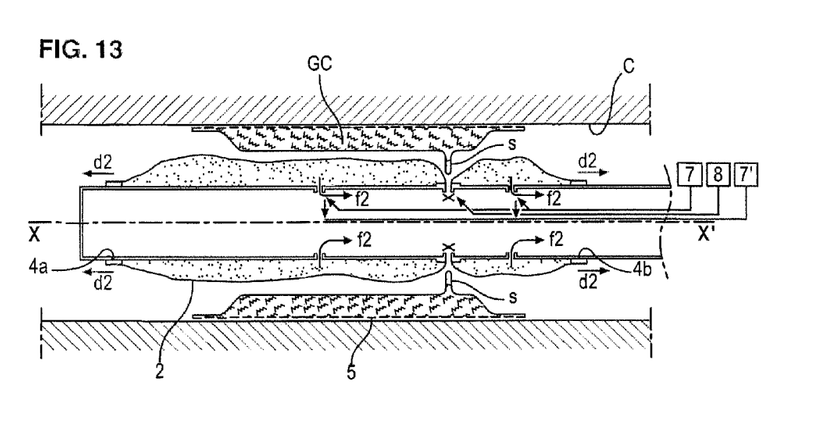

Once it has sufficiently hardened, the membrane is deflated by aspirating the inflation fluid L1 (arrows f2); the membrane retracts radially and extends axially (arrows d2). It returns to its initial configuration.

The cement forms an annular jacket GC which coats the zone Z and makes it leaktight by virtue of the presence of the sleeve 5.

Figure 14:
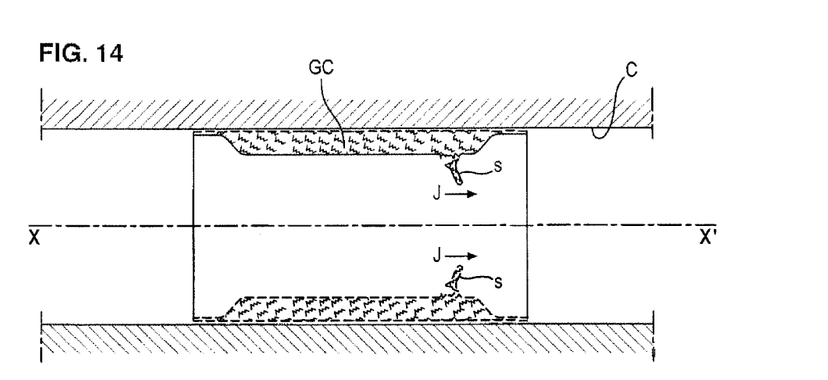

The cement injection cores s which correspond to the channels 6 and which still adhere to this sheath can be cut off either simply as the device is withdrawn or by means of a special tool (arrows J, FIG. 14).

The same device can optionally be reused to treat other portions of the casing, or even other casings.

In this case, the cementing is carried out without the sleeve 5.

By way of indication, the thickness of the wall of the jacket GC is for example between 35 and 40 millimeters, whereas its internal diameter is around 80 mm. Its length may be several meters.

In the present description, the term "wires or fibres" will also be understood to mean similar filiform elements such as cables or cords.

These elements may be made of any material with high mechanical strength, for example steel, carbon or aramid.

Means other than those described above could of course be used to limit the amplitude of radial expansion of the median zone of the preform. For example, it could be provided with a flexible and non-extendable armature which is initially slack and can deform radially at the same time as the membrane over a limited course, beyond which it is taut.

The invention claimed is:

1. A device for cementing a well or a pipe having a wall, for example a casing, having a portion to be cemented, which device comprises an assembly which is designed to be introduced into the well or pipe and to be positioned opposite the portion to be cemented, the assembly comprising a tubular mandrel and an inflatable tubular membrane having end zones, the inflatable tubular membrane surrounding said mandrel, the inflatable tubular membrane having a wall made of a flexible and elastic material which expands radially under the effect of an internal pressure, the end zones of said inflatable tubular membrane being able to dilate radially upon introduction of a pressurized fluid into said inflatable tubular membrane in order to form annular beads which are applied firmly against the wall of the well or pipe, on either side of the portion to be cemented, and a median zone located between the end zones of said inflatable tubular membrane also dilates radially, but with a lesser amplitude, to form an annular space between the median zone and the portion of wall to be cemented, the device additionally comprising orifices for injecting a curable liquid cement into the annular space while the inflatable tubular membrane is kept inflated and for deflating said inflatable tubular membrane once the cement has set, wherein said inflatable tubular membrane is secured to said mandrel by an annular anchoring part which is radially non-extendable and is located within said median zone, wherein end zones of said annular anchoring part are fixed to movable rings, which are guided in translation in a sealed manner on the mandrel to slide axially on the mandrel as a result of the inflation or deflation of said inflatable tubular membrane.

2. The device according to claim 1, wherein the median zone of said inflatable tubular membrane is provided with means for limiting radial expansion of the inflatable tubular membrane to a predetermined maximum diameter.

3. The device according to claim 2 wherein said inflatable tubular membrane is reinforced by an armature comprising at least one ply of cables, wires, or fibers wound helically with respect to a longitudinal central axis of the inflatable tubular membrane and wherein, in said median zone, initial angles are formed tangentially by said cables, wires, or fibres with respect to the longitudinal central axis of the inflatable tubular membrane, such that, after inflation, the diameter of the inflatable tubular membrane reaches a predetermined given value when the respective angles reach a value of around 54°.

4. The device according to claim 3 wherein a transition is formed between the anchoring part of the inflatable tubular membrane and portions of the median zone with limited radial expansion takes place, the portions of the median zones adjacent to the anchoring part being deformed under the effect of the inflation to place the portions of the median zone adjacent to the anchoring parts, in planes which are substantially perpendicular to the longitudinal central axis of the inflatable tubular membrane, and wherein the initial angles of inclination of the cables, wires, or fibres with respect to the longitudinal central axis of the inflatable tubular membrane have approximately the following values:

of around 18° to 25° in the end zones of the inflatable tubular membrane;

of around 35° to 45° in the median zone, except in the portions adjacent to the anchoring part;

of 0° in the portions adjacent to the anchoring part.

5. The device according to claim 4, wherein the portions of the median zone adjacent to the anchoring part are grooved, each said portion having at least one groove located in an axial extension of a similar groove formed in the non-adjacent portions of the median zone, so that, after the inflation of the inflatable tubular membrane, the portions of the median zone adjacent to the anchoring part form a channel for injection of the cement, the device further comprising supply orifices penetrating the tubular mandrel and the anchoring part for the injection.

6. The device according to claim 3, wherein said inflatable tubular membrane is reinforced by the armature comprising several plies of wires or fibres wound helically with respect to the longitudinal central axis, the directions of winding of two superposed plies being reversed.

7. The device according to claim 1, wherein the wall of the mandrel is penetrated by inlet orifices for the pressurized fluid, the orifices opening inside the inflatable tubular membrane between said movable rings and said anchoring part.

8. The device according to claim 1, wherein the wall of the inflatable tubular membrane is grooved externally at the end zones, to allow evacuation of a fluid present in the well or pipe during inflation.

9. The device according to claim 1, wherein said inflatable tubular membrane is covered with a thin-walled sleeve which is made of a flexible and elastic material which is pressed against the portion of well to be cemented when the cement is injected into the annular space formed between the median zone of the inflatable tubular membrane and the portion of well to be cemented.

10. The device according to claim 9, wherein said sleeve inflates, increasing in volume in the direction of a thickness of said sleeve, when said sleeve is in contact with the liquid present in the well or pipe to ensure good sealing with the zone of the well to be sealed.

11. The device according to claim 1, wherein the annular beads are two annular end beads, one of the annular end beads being applied against the wall of the well or pipe before the other annular end bead.

* * * * *